United States Patent [19]

Stechmann

[11] 3,733,531

[45] May 15, 1973

[54] ELECTRONIC REGULATING CIRCUIT

[75] Inventor: Helmut Stechmann, Schwenningen A. N., Germany

[73] Assignee: Kienzle Uhrenfabriken GmbH, Schwenningen am Neckar, Germany

[22] Filed: Dec. 23, 1971

[21] Appl. No.: 211,561

[52] U.S. Cl. ....................318/114, 58/23 A, 58/23 V, 318/122, 318/130, 318/132, 331/109, 331/116 M

[51] Int. Cl. ............................................H02k 33/12

[58] Field of Search........................318/114, 119, 122, 318/126, 127, 128, 129, 130, 132, 133, 138; 58/23 R, 23 A, 23 BA, 23 AC, 23 V; 331/75, 109, 116 R, 116 M

[56] References Cited

UNITED STATES PATENTS 3,593,200 7/1971 Reich ..................................331/109

*Primary Examiner*—James D. Trammell

*Assistant Examiner*—H. Huberfeld

*Attorney*—William D. Hall et al.

[57] ABSTRACT

An electronic regulating circuit to stabilize the amplitude of swing of a mechanical vibrating system, comprising an output coil, a control coil, and an output transistor whose base is connected to a voltage divider comprising a resistor and the collector-emitter section of a first control transistor. The base of the first control transistor is connected to the control coil in such a manner that the first control transistor simultaneously will be rendered conductive at least in part, by the same inductive voltage of specific polarity that renders the output transistor conductive.

4 Claims, 3 Drawing Figures

ELECTRONIC REGULATING CIRCUIT

BACKGROUND OF THE INVENTION

Electronic regulating circuits for stabilizing the amplitude of swing of a mechanical vibrating system are known wherein, in the case of uniform transistors, the base of the control transistor and the base of the output transistor are both connected to the same side of the control coil. In case of non-uniform transistors, the base of the control transistor is connected to the side of the control coil other than the side to which the base of the output transistor is connected. This arrangement causes the output transistor as well as the control transistor to become conductive in response to the same control pulse of the suitable polarity, the control transistor becoming at least partially conductive. Control pulses of other polarity will not affect the two transistors. Circuits of this type have a proper regulating ability; in contrast, in the case of the prior art regulating circuit, the control transistor becomes conductive in functional relation to the magnitude of the inductive voltage. In other words, in the prior art system, the resistance of the emitter-collector section of the control transistor is dependent on the amplitude of the mechanical vibrating system.

SUMMARY OF THE INVENTION

It is the aim of the invention, to improve the regulating ability of the circuit. In particular, the invention is designed to lower the losses caused by the control system and to avoid influences on the timing due to voltage changes.

This is accomplished in the case of a circuit as described above by placing a capacitor between the base and the emitter of the output transistor, and by connecting the emitter-collector portion of an additional control transistor across this capacitor, its emitter being connected with the base of the first control transistor.

DESCRIPTION OF THE PREFERRED EMBODIMENTS

Figure 1:
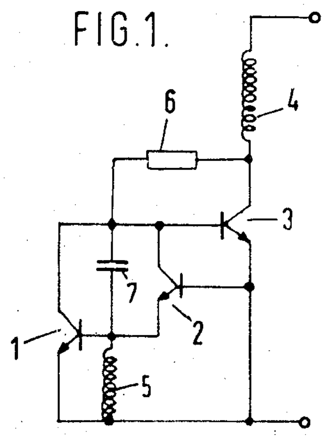
FIG. 1 shows a circuit with uniform transistors, whereby the base of the second control transistor is connected with the emitter of the output transistor.

In the circuit arrangement of FIG. 1 the output coil 4 is included in the collector-emitter circuit of the output transistor 3. The base of transistor 3 is connected to a voltage divider which comprises resistor 6 and the collector-emitter circuit section of the first control transistor 1. Capacitor 7 is connected between the base of the output transistor 3 and the base of the first control transistor 1. A control coil 5 is connected between the base of the first control transistor 1 and the emitter of the output transistor 3.

Upon the appearance of an inductive voltage of proper polarity, the emitter-collector sections of transistors 1 and 3 will both be rendered at least partially conductive. The emitter-collector portion of a second control transistor 2 is connected in parallel with capacitor 7, the base of transistor 2 being connected to the emitter of output transistor 3.

Figure 2:
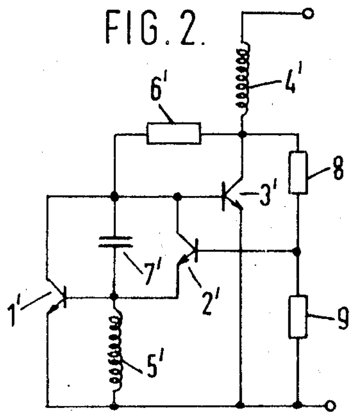
FIG. 2 shows a modification of the circuit, whereby the base of the second control transistor is connected to a voltage divider.

In the modified circuit shown in FIG. 2, the base of the second control transistor 2' is connected to the center of a voltage divider which comprises the series-connector resistors 8 and 9.

Figure 3:
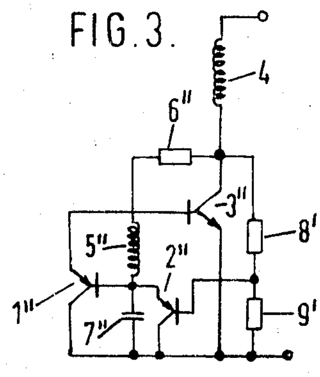
FIG. 3 shows a circuit where the two control transistors are not uniform in comparison with the output transistor.

The two control transistors 1'' and 2'' of the circuit shown in FIG. 3 have a conductivity which differs from the type of conductivity of the output transistor 3''. Since the transistors 1'' and 3'' are non-uniform, the control coil 5'' is now connected between the base of the output transistor 3'' and the base of the control transistor 1''. The capacitor 7'' is connected between the base of the first control transistor 1'' and the emitter of the output transistor 3''. The second control transistor 2'' is connected across the capacitor 7. Its base is again connected to the center tap of a voltage divider comprising resistor 8' and 9'. However, it is always possible to connect this base with the emitter of the output transistor 3''; however, in this case a resistance can be connected between the collector of the control transistor 2'' and its base.

What I claim is:

1. An electronic regulating circuit for stabilizing the amplitude of swing of a mechanical vibrating system comprising in combination, an output coil, a control coil, and an output transistor, the base of said output transistor being connected to a voltage divider which comprises a resistance and the collector-emitter portion of a first control transistor, the base of said first control transistor being connected to the control coil with such polarity that said first control transistor simultaneously will go into conduction, at least partially, in response to the same inductive voltage of specific polarity as the output transistor, a capacitor connected between the base and the emitter of the output transistor, and a second control transistor having its emitter-collector portion connected in parallel with said capacitor, the emitter of said second control transistor being connected to the base of the first control transistor.

2. The regulating circuit of claim 1 wherein said first and second control transistors are identical in type.

3. The regulating circuit of claim 1 wherein the base of the second control transistor is connected to the emitter of the output transistor.

4. The regulating circuit according to claim 1 wherein the base of the second control transistor is connected to the center of a voltage divider.

* * * * *